(12) United States Patent
Song et al.

(10) Patent No.: US 6,232,020 B1
(45) Date of Patent: May 15, 2001

(54) NON-FLAMMABLE ELECTROLYTE COMPOSITIONS AND LITHIUM SECONDARY BATTERIES MADE THEREOF

(75) Inventors: Eui-Hwan Song; Won-Il Jung; Duck-Chul Hwang, all of Chungcheongnam-do; Hyung-Gon Noh, Seoul, all of (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/564,729

(22) Filed: May 3, 2000

(30) Foreign Application Priority Data

May 3, 1999 (KR) .................................................. 99-15927

(51) Int. Cl.$^7$ ...................................................... H01M 6/16
(52) U.S. Cl. .......................... 429/326; 429/327; 429/330; 429/340; 429/344; 429/231.1; 429/231.8; 252/62.2
(58) Field of Search .................................... 429/326, 327, 429/330, 340, 344, 231.1, 231.8; 252/62.2

(56) References Cited

U.S. PATENT DOCUMENTS 5,580,684 * 12/1996 Yokoyama et al. .................. 429/194
5,633,099 * 5/1997 Yokoyama et al. .................. 429/194
5,686,138 * 11/1997 Fujimoto et al. .................... 429/197
5,830,600 11/1998 Narang et al. ....................... 429/192

FOREIGN PATENT DOCUMENTS 10-106625 * 4/1998 (JP) .

* cited by examiner

Primary Examiner—Laura Weiner
(74) Attorney, Agent, or Firm—Blakely Sokoloff Taylor & Zafman

(57) ABSTRACT

Disclosed are non-flammable electrolyte compositions of the present invention that comprise a mixed solvent comprising carbonate-, thiocarbonate-, and phosphate-based solvents and inorganic additives such as metal compounds or metal halogen compounds. A mixed ratio of carbonate:thiocarbonate:phosphate-based solvent is in the range of 20~75:5~30:15~50. The metal compounds or metal halogen compounds are exemplified by triphenylbismuth carbonate, triphenylbismuth, bismuth subnitrate, bismuth subcarbonate, dimethyl pyrocabonate, diethyl pyrocarbonate, bismuth fluoride, and the like. The inorganic additives are contained in the electrolytes of the present invention in the amounts of about 0.3 to about 5 weight percent of the mixed solvent.

9 Claims, 1 Drawing Sheet

NON-FLAMMABLE ELECTROLYTE COMPOSITIONS AND LITHIUM SECONDARY BATTERIES MADE THEREOF

CROSS REFERENCE TO RELATED APPLICATION

This application is based on application No. 99-15927 filed in the Korean Industrial Property Office on May 3, 1999, the content of which is incorporated hereinto by reference.

BACKGROUND OF THE INVENTION (a) Field of the Invention

The present invention relates to nonflammable electrolyte compositions and lithium secondary batteries thereof, more particularly to nonflammable electrolyte compositions comprising carbonate-, thiocarbonate-, and phosphate-based solvent and inorganic additives which are capable of forming a solid electrolyte interface (hereinafter, referred to as 'SEI') on a surface of a negative electrode, thereby greatly enhancing the overall safety of the battery, and lithium secondary batteries thereof.

(b) Description of the Related Art

With the recent proliferation in the use of portable electronic devices, coupled with advancements made enabling increasingly smaller sizes and weights for these devices, research is being actively pursued to improve the energy density capabilities of lithium secondary batteries. These portable electronic machines have made it necessary to develop lithium secondary batteries with high energy density.

In the past, although lithium metal was used as the anode active material in lithium secondary batteries, a serious problem of dendritic formation on the surface of the lithium metal resulted during charging and discharging. This may cause short circuits, or more seriously, it could lead to the explosion of the battery. To prevent such problems, carbonaceous material is now widely used for the negative active material.

For cathode active materials in secondary batteries, metal chalcogenide compounds, enabling insertion and separation of lithium ions, are generally used, i.e. composite metal oxides such as $LiMn_2O_4$, $LiMnO_2$, $LiCoO_2$, $LiNiO_2$, and $LiNi_{1-x}Co_xO_2$ ($0<x<1$). The Mn-based active materials, $LiMn_2O_4$, and $LiMnO_2$, can be easily synthesized, are less expensive than the other materials, and have minimal negative affects on the environment. However, the capacities of these materials are low. In particular, $LiMn_2O_4$ has a relatively low discharge capacity as compared to other lithiated transition metal oxides such as $LiCoO_2$ and $LiNiO_2$. Furthermore, when cycled at high rates of charge and discharge are cycled, the discharge capacity is excessively reduced. When the charge and discharge operations are continuously performed at high temperatures, manganese ions readily elute into the electrolyte from the surface of $LiMn_2O_4$. These manganese ions seriously deteriorate the cycle life characteristics of the battery. $LiCoO_2$ has been commercialized by Sony Energy Tec. as it exhibits an electrical conductivity at room temperature, provides a high level of battery voltage, and has exceptional electrode characteristics, even though it is unsafe when charging or discharging at high rates, and is more costly than the other materials. $LiNiO_2$ has a high discharge and charge capacity and is the least expensive of the above active materials for positive electrodes, but is not easily synthesized.

In addition, the choice of suitable electrolytes is one of the factors for improving cell characteristics because reactions of electrodes and electrolyte have an effect on cell performance. The electrolyte systems have previously only played a role of transfer of lithium ions. However, these electrolytes can be decomposed, causing severe deterioration of cell performance. Therefore, carbonate-based solvents are known preferable as solvents of high-voltage lithium secondary batteries. Unfortunately, carbonate-based organic solvents can be easily ignited by exterior ignition sources. In this regard, various methods have been developed to advance the safety of lithium secondary batteries containing organic solvents.

In one approach, Sony Energy Tec. tried to apply a mixture of phosphate-based and carbonate-based solvents as electrolyte solvent to improve cell safety. However, this method has disadvantages of decaying cell performance by increasing non-reversible capacity and decreasing of cell life characteristics due to the decomposition of phosphate during the charge and discharge reactions.

As a second approach, U.S. Pat. No. 5,830,600 discloses electrolyte containing a phosphate, a phospholane, a cyclophosphazene, a silane, a fluorinated carbonate, a fluorinated polyether, or mixtures thereof. However, this method also results in a decline of cell performance due to the decomposition of phosphate-based electrolyte solvent.

SUMMARY OF THE INVENTION

It is an object of the present invention to provide a non-flammable electrolyte for lithium secondary batteries with advanced safety features.

It is another object of the present invention to provide non-flammable electrolyte compositions for lithium secondary batteries containing a thiocarbonate which can reduce the production of oxygen.

It is still another object of the present invention to provide non-flammable electrolyte compositions for lithium secondary batteries containing an inorganic additive which minimizes decomposition of solvent by forming SEI films on the surface of negative electrodes during the initial charging.

It is still another object of the present invention to provide lithium secondary batteries with good safety and cell performance.

These and other objects may be achieved by a non-flammable electrolyte for lithium secondary batteries including inorganic additives in a mixed solvent which comprises carbonate-, thiocarbonate-, and phosphate-based solvents. The inorganic additives enhance safety and performance of cells by forming SEI films on the surface of negative electrodes during the initial charging.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
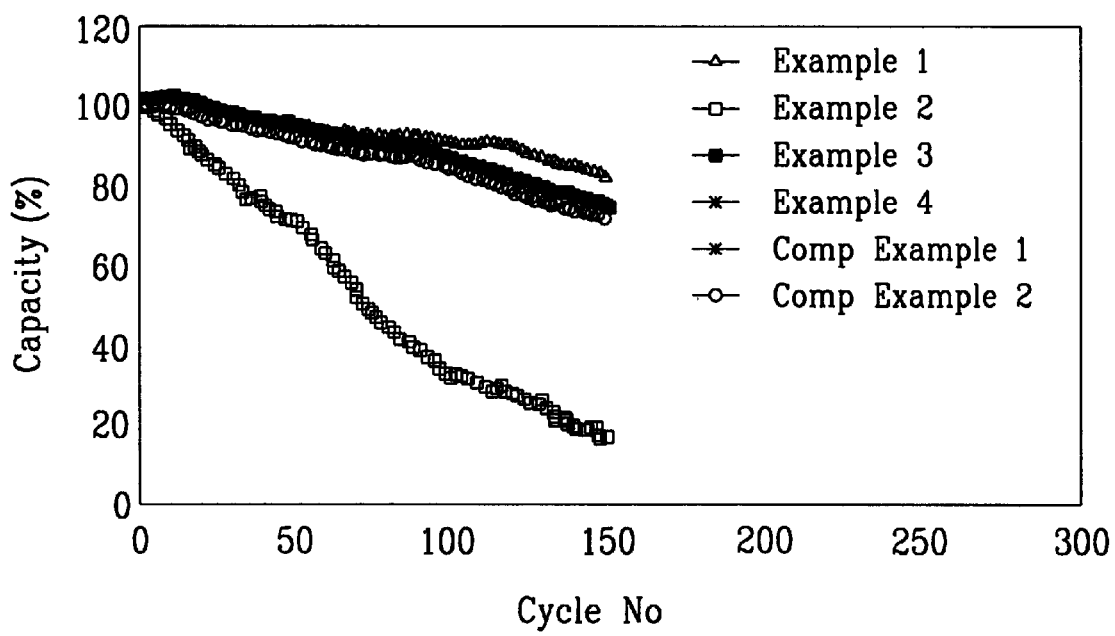
FIG. 1 is a graph illustrating cycle life characteristics of lithium secondary cells according to Examples 1~4 of the present invention and Comparative Examples 1~2.

Carbonate-based solvents used typically for electrolytes for lithium secondary batteries are organic solvents that are ignitable by external ignition sources. To advance cell safety by solving this problem, phosphate containing non-flammable solvents are known to have been applied. However, this method has a disadvantage in that it results in a decline of cell performance by excessively increasing the non-reversible capacity and deteriorating of cell cycle life characteristics due to the decomposition of phosphate-based solvents during charge and discharge reactions. Accordingly, the present invention provide non-flammable electrolytes which are prepared by adding inorganic additives to a mixed solvent comprising carbonate-, thiocarbonate-, and phosphate-based solvents. In other words, the electrolytes are endowed with flame-retardancy by adding phosphate-based solvents, a decreased oxygen production producibility by adding thiocarbonate-based solvents and advanced cell performance characteristics by adding inorganic additives such as metal compounds and metal halogen compounds.

In the present invention, cyclic carbonates, linear carbonates, or mixtures thereof can be used as the carbonate-based solvents. Preferable examples are ethylene carbonate (EC), propylene carbonate (PC), diethyl carbonate (DEC), dimethyl carbonate (DMC), ethylmethyl carbonate (EMC), and dipropyl carbonate (DPC). As thiocarbonate-based solvents, dimethyl thiocarbonate (DMTC), and ethylene trithiocarbonate (ETTC) can be used. As phosphate-based solvents, trimethyl phosphate (TMP), and triethyl phosphate (TEP) can be used. A mixture ratio of the carbonate:thiocarbonate:phosphate-based solvent is in the range of 20~75:5~30:15~50. If the mixture ratio is outside of this range, a flame-retardant effect does not exist and a severe decrease of capacity occurs.

The inorganic additives added to enhance cell performance are metal compounds or metal halogen compounds. The metal compounds or metal halogen compounds are exemplified by triphenylbismuth carbonate, triphenylbismuth, bismuth subnitrate, bismuth subcarbonate, dimethyl pyrocabonate, diethyl pyrocarbonate, bismuth fluoride, and the like. The inorganic additives contained in the electrolytes of the present invention are in the amounts ranging from about 0.3 to about 5 weight percent of the mixed solvent. When the inorganic additives amount to less than 0.3 weight percent, there is no improvement of the cell cycle life characteristics. In contrast, when the inorganic additives amount to more than 5 weight percent, the discharge capacity and discharge efficiency decrease.

The electrolyte composition can include supporting salts such as lithium hexafluorophosphate ($LiPF_6$), lithium tetrafluoroborate ($LiBF_4$), lithium hexafluoroasenate ($LiAsF_6$), lithium perchlorate ($LiClO_4$), lithium trifluoromethane-sulfonate ($CF_3SO_3Li$), or mixtures thereof.

A lithium secondary battery contains a positive electrode, a negative electrode, and an electrolyte. The positive electrode includes a graphitic carbonaceous material as an anode active material capable of inserting and separating lithium ions. The carbonaceous material has approximately 3.35~3.38 Å of $d_{002}$ interplanar distance, a crystalline size (Lc) of approximately 20 $\mu$m measured by X-ray diffraction, and an exothermic peak at temperature of 700° C. The carbonaceous material is prepared by a method comprising either carbonizing and graphitizing mesophase granular particles or carbonizing and graphitizing mesophase pitch fibers. Also, either man-made or natural graphite can be used. The negative electrode includes lithium composite oxides as a cathode active material capable of inserting and separating lithium ions. $LiCoO_2$, $LiNiO_2$, $LiNi_{1-x-y}Co_xM_yO_2$ (where, $0 \leq x \leq 1$, $0 \leq y \leq 1$, $0 \leq x+y \leq 1$, and M is selected from the group consisting of Al, Sr, Mg, and La), $LiMn_2O_4$, $LiMnO_2$, and the like can be used.

The carbonate/thiocarbonate/phosphate-based solvents with the inorganic additives according to the present invention are applied as the electrolyte between the positive electrode and the negative electrode. The electrolyte compositions form SEI films on the surface of negative electrode during initial charging. The SEI films inhibit decay of cell performance caused by an increase of non-reversible capacity and a decrease of cell life characteristics by reducing the decomposition of phosphate during the charge and discharge reactions.

The following examples further illustrate the present invention.

EXAMPLE 1

An electrolyte composition was prepared by adding 1 weight percent of triphenylbismuth carbonate as an inorganic additive in a mixed solvent comprising a 3:4:1:2 volume ratio of ethylene carbonate (EC), dimethyl thiocarbonate (DMTC), diethyl carbonate (DEC), and trimethyl phosphate (TMT). The electrolyte composition was injected into a lithium secondary battery comprising a positive electrode and a negative electrode, thereby fabricating a 18650 lithium secondary cell. The positive electrode comprised $LiNi_{1-x-y}Co_xSr_yO_2$ ($0 \leq x \leq 1$, $0 \leq y \leq 1$, $0 \leq x+y \leq 1$) and the negative electrode comprised graphite material (KMFC: a product of Kawasaki Steel Inc.).

EXAMPLE 2

An electrolyte composition preparation procedure was performed in the same way as in Example 1 with the exception that dimethyl pyrocarbonate as the inorganic additive was used. A lithium secondary cell was fabricated with the resulting electrolyte in combination with the other components as described in Example 1.

EXAMPLE 3

An electrolyte composition preparation procedure was performed in the same way as in Example 1 with the exception that diethyl pyrocarbonate as the inorganic additive was used. A lithium secondary cell was fabricated with the resulting electrolyte in combination with the other components as described in Example 1.

EXAMPLE 4

An electrolyte composition preparing procedure was performed in the same way as in Example 1 with the exception that bismuth fluoride as the inorganic additive was used. A lithium secondary cell was fabricated with the resulting electrolyte in combination with the other components as described in Example 1.

COMPARATIVE EXAMPLE 1

An electrolyte composition was prepared by mixing a 3:4:1 volume ratio of ethylene carbonate (EC), dimethyl carbonate (DMC) and diethyl carbonate (DEC). A lithium secondary cell was fabricated with the resulting electrolyte in combination with the other components as described in Example 1.

COMPARATIVE EXAMPLE 2

An electrolyte composition was prepared by mixing a 3:4:1:2 volume ratio of ethylene carbonate (EC), dimethyl thiocarbonate (DMTC), diethyl carbonate (DEC), trimethyl phosphate (TMT). A lithium secondary cell was fabricated with the resulting electrolyte in combination with the other components as described in Example 1.

The cells fabricated according to Examples 1~4 and Comparative Example 1~2 were charged and discharged at a rate of 1C. Table 1 shows the cycle life characteristics of the cells after 100 charging and discharging cycles, initial discharge capacity, non-reversible capacity, and safety characteristics of the cells.

TABLE 1

| | | Capacity | | Safety level* | |
|---|---|---|---|---|---|
| | Cycle life | Initial discharge capacity (mAh) | Non-reversible capacity (%) | 1C Overcharge | Feed-Through |
| Example | | | | | |
| 1 | 87% | 2060 | 91 | L0 | L1 |
| 2 | 86% | 2011 | 89 | L0 | L1 |
| 3 | 85% | 1966 | 87 | L0 | L1 |
| 4 | 85% | 1920 | 85 | L0 | L1 |

TABLE 1-continued

| | | Capacity | | Safety level* | |
|---|---|---|---|---|---|
| | Cycle life | Initial discharge capacity (mAh) | Non-reversible capacity (%) | 1C Overcharge | Feed-Through |
| Comp. Example | | | | | |
| 1 | 90% | 2100 | 93 | L1 | L5 |
| 2 | 33% | 1695 | 75 | L0 | L1 |

Note)
*: L0: Good, L1: Leakage, L2: Sparks or Flame, L3: Smoke, L4: Ignition, L5: Breakage In Table 1 above, the cells fabricated according to Examples 1~4 display good safety characteristics as well as good cycle life properties. On the contrary, the cell of Comparative Example 1 is inferior in safety characteristics and the cell of Comparative Example 2 has lower in cycle life properties. FIG. 1 represents the capacities and cycle life characteristics of the cells of Examples 1~4 and Comparative Examples 1~2.

Table 2 below represents safety test results of the cell of Example 1 under various conditions.

TABLE 2

| | OCV (V)* | Leakage (L1) | Sparks (L2) | Flame (L2) | Smoke (L3) | Ignition (L4) | Breakage (L5) | Max. Temp. (° C.) | Safety Level** |
|---|---|---|---|---|---|---|---|---|---|
| 1C Overcharge | 4.157 | x | x | x | x | x | x | 107 | L0 |
| | 4.157 | x | x | x | x | x | x | 104 | L0 |
| | 4.156 | x | x | x | x | x | x | 106 | L0 |
| | 4.157 | x | x | x | x | x | x | 98 | L0 |
| | 4.156 | x | x | x | x | x | x | 109 | L0 |
| 3C Overcharge | 4.157 | x | x | x | x | x | x | 158 | L0 |
| | 4.157 | x | x | x | x | x | x | 134 | L0 |
| | 4.157 | o | x | x | x | x | x | 158 | L1 |
| | 4.157 | o | x | x | x | x | x | 148 | L1 |
| | 4.157 | x | x | x | x | x | x | 150 | L0 |
| Feed-Through | 4.158 | o | x | x | x | x | x | 85 | L1 |
| | 4.149 | o | x | x | x | x | x | 106 | L1 |
| | 4.152 | o | x | x | x | x | x | 92 | L1 |
| | 4.159 | o | x | x | x | x | x | 104 | L1 |
| | 4.156 | o | x | x | x | x | x | 97 | L1 |
| Overcharge And Feed-Through | 4.211 | o | x | x | x | x | x | 96 | L1 |
| | 4.210 | o | x | x | x | x | x | 91 | L1 |
| | 4.212 | o | x | x | x | x | x | 84 | L1 |
| | 4.198 | o | x | x | x | x | x | 88 | L1 |
| | 4.193 | o | x | x | x | x | x | 105 | L1 |
| Vertical Compression | 4.154 | o | x | x | x | x | x | 24 | L1 |
| | 4.154 | o | x | x | x | x | x | 24 | L1 |
| | 4.154 | o | x | x | x | x | x | 26 | L1 |
| | 4.156 | o | x | x | x | x | x | 26 | L1 |
| | 4.154 | o | x | x | x | x | x | 31 | L1 |
| Horizontal Compression | 4.156 | o | x | x | x | x | x | 27 | L1 |
| | 4.154 | o | x | x | x | x | x | 27 | L1 |
| | 4.153 | o | x | x | x | x | x | 28 | L1 |
| | 1.153 | o | x | x | x | x | x | 29 | L1 |
| | 1.154 | o | x | x | x | x | x | 28 | L1 |

Note)
*OCV: Open Circuit Voltage
**Safety level: L0: Good, L1: Leakage
o: occurring   x: not-occurring Table 3 below represents safety test results of the cell of Comparative Example 1 under various conditions.

TABLE 3

| | OCV (V)* | Leakage (L1) | Sparkle (L2) | Flame (L2) | Smoke (L3) | Ignition (L4) | Breakage (L5) | Max. Temp. (° C.) | Safety level** |
|---|---|---|---|---|---|---|---|---|---|
| Feed-Through | 4.150 | o | o | o | o | o | o | 434 | L5 |
| | 4.162 | o | o | o | o | o | o | 417 | L5 |
| | 4.144 | o | o | o | o | o | o | 350 | L5 |
| | 4.162 | o | o | o | o | o | o | 342 | L5 |
| | 4.162 | o | o | o | o | o | o | 487 | L5 |
| Overcharge And Feed-Through | 4.294 | o | o | o | o | o | o | 458 | L5 |
| | 4.295 | o | o | o | o | o | o | 431 | L5 |
| | 4.297 | o | o | o | o | o | o | 154 | L5 |
| | 4.294 | o | o | o | o | o | o | 396 | L5 |
| | 4.184 | o | o | o | o | o | o | 341 | L5 |
| | 4.265 | o | o | o | o | o | o | 155 | L5 |
| | 4.240 | o | o | o | o | o | o | 163 | L5 |
| | 4.221 | o | o | o | o | o | o | 73 | L5 |
| | 4.225 | o | o | o | o | o | o | 204 | L5 |

Note)
*OCV: Open Circuit Voltage
**Safety level: L5: Breakage
o: occurring  x: not-occurring In Table 3, safety characteristics of the cell of Comparative Example 1 were very poor. In particular, the temperature sensor separated during overcharge and feed-through As described above, the electrolytes of the present invention enhance the safety of the cells by containing inorganic additives such as metal compounds or metal halogen compounds in a mixture of carbonate-, thiocarbonate-, and phosphate-based solvents and improve the deterioration of cycle life and an increase of non-reversible capacity.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte composition for a lithium secondary battery comprising:

a mixed solvent comprising carbonate-based solvent, thiocarbonate-based solvent and phosphate-based solvent; and an inorganic additive comprising metal compounds or metal halogen compounds; and a supporting salt.

2. The electrolyte composition of claim 1 wherein a mixed ratio of the carbonate:thiocarbonate:phosphate-based solvents is in the range of 20~75:5~30:15~50.

3. The electrolyte composition of claim 1 wherein the inorganic additive is selected from the group consisting of triphenylbismuth carbonate, triphenylbismuth, bismuth subnitrate, bismuth subcarbonate, and bismuth fluoride.

4. The electrolyte composition of claim 1 wherein the inorganic additive is contained in the amounts of about 0.3 to about 5 weight percent of the mixed solvent.

5. The electrolyte composition of claim 1 wherein the composition comprises supporting salts selected from the group consisting of lithium hexafluorophosphate ($LiPF_6$), lithium tetrafluoroborate ($LiBF_4$), lithium hexafluoroasenate ($LiAsF_6$), lithium perchlorate ($LiClO_4$), lithium trifluoromethanesulfonate ($CF_3SO_3Li$), and mixtures thereof.

6. A lithium secondary battery comprising;

the electrolyte composition of claim 1;

a positive electrode comprising resin binder and graphitic carbonaceous material capable of insertion and separation of lithium ions as an anode active material; and a negative electrode comprising lithium composite oxides capable of insertion and separation of lithium ions as a cathode active material.

7. The lithium secondary battery of claim 6 wherein the carbonaceous material has approximately 3.35~3.38 Å of $d_{002}$ interplanar distance, a crystalline size(Lc) of approximately 20 μm measured by X-ray diffraction, and an exothermic peak at temperature of 700° C.

8. The lithium secondary battery of claim 6 wherein the carbonaceous material is prepared by a method comprising carbonizing and graphitizing mesophase granular particles.

9. The lithium secondary battery of claim 6 wherein the carbonaceous material is prepared by a method comprising carbonizing and graphitizing mesophase pitch fibers.

* * * * *